United States Patent [19]

Mori et al.

[11] Patent Number: 4,703,114

[45] Date of Patent: Oct. 27, 1987

[54] POLYETHERS HAVING TERTIARY ALCOHOLIC TERMINALS

[75] Inventors: Shigeo Mori, Kyoto; Junichiro Matsumoto, Ohtsu, both of Japan

[73] Assignee: Dai-Ichi Kogyo Seiyaku Co., Ltd., Kyoto, Japan

[21] Appl. No.: 764,042

[22] Filed: Aug. 9, 1985

[30] Foreign Application Priority Data

Aug. 9, 1984 [JP]   Japan ................................ 59-167377

[51] Int. Cl.$^4$ .......................... C07G 3/00; C07H 15/04; C07C 43/11; C07C 43/18
[52] U.S. Cl. ...................................... 536/4.1; 536/120; 568/607; 568/608; 568/609; 568/616; 568/620; 568/624; 568/625
[58] Field of Search ............... 568/607, 608, 609, 616, 568/625, 620, 624; 536/4.1, 120

[56] References Cited

U.S. PATENT DOCUMENTS

| | | | |
|---|---|---|---|
| 2,886,600 | 5/1959 | Horsley et al. | 568/625 |
| 3,542,759 | 11/1970 | Gelotte et al. | 568/625 |
| 4,275,244 | 6/1981 | Helfest et al. | 568/607 |
| 4,302,349 | 11/1981 | Kosswig et al. | 568/625 |

OTHER PUBLICATIONS

Ikeda et al, "Synthesis of Substituted Crown Ether, from Oligoethylene Glycols", J. Org. Chem. 45 (26), 1980, pp. 5355–5358.

*Primary Examiner*—Charles F. Warren
*Assistant Examiner*—John A. Sopp
*Attorney, Agent, or Firm*—Millen & White

[57] ABSTRACT

Polyethers of the formula:

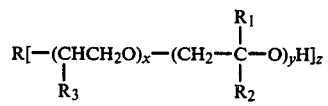

wherein:

R is the residue of a starting active hydrogen compound with removal of the active hydrogen atom, $R_1$ is a $C_1$–$C_{10}$ alkyl or aryl, $R_2$ is a $C_1$–$C_{10}$ alkyl, $R_3$ is H, $CH_3$, $C_2H_5$ or phenyl, x is 5–100, y is 1–5, and z is 2–8 are less active than those having primary or secondary alcoholic function at terminals.

5 Claims, No Drawings

POLYETHERS HAVING TERTIARY ALCOHOLIC TERMINALS

BACKGROUND OF THE INVENTION

Hydroxyl terminated polyethers find uses as raw materials of polyurethane and polyester resins. Others uses include cosmetics, plasticizers, surfactants and raw materials of these products. Conventional polyethers are terminated with primary or secondary alcoholic groups, the presence of which normally contributes to their desirablity for intended uses. It has been experienced in certain cases that the primary or secondary alcohol function is too active and therefore the presence of which is not desirable. For example, polyethers having too active an alcoholic function can lead to a premature reaction when reacted with polyisocyanates. Attempts have been made to remove the hydroxyl function by blocking with a group such as methyl or acyl, or replacing the hydroxyl group with chlorine. Obviously, polyethers having blocked or chlorinated terminals are not suitable for uses in which the presence of a hydroxyl function is essential, e.g. for the production of polyurethane and polyester resins.

SUMMARY OF THE INVENTION

It is therefore an object of the present invention to provide new hydroxyl terminated polyethers which are free from the foregoing defects and therefore less active than conventional hydroxyl terminated polyethers.

Other objects and advantages of the present invention will become apparent from the description proceeds.

According to the present invention, these objects have been achieved by providing novel polyethers of the formula:

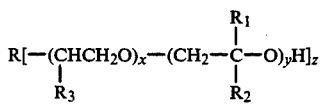

wherein:
R is the residue of a starting active hydrogen compound having two to eight active hydrogen atoms after removal of such active hydrogen atoms,
$R_1$ is $C_1$-$C_{10}$ alkyl or aryl,
$R_2$ is $C_1$-$C_{10}$ alkyl,
$R_3$ is H, $CH_3$, $C_2H_5$ or phenyl,
x is 5-100,
y is 1-5, and
z is 2-8.

DETAILED DESCRIPTION OF THE INVENTION

The novel polyethers of the present invention may be prepared by reacting a compound of the formula:

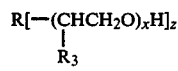

with an epoxide of the formula:

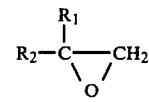

wherein
R, $R_1$, $R_2$, and $R_3$ have the values given above,
in the presence of a basic or acidic catalyst.

The compounds of the formula II generally correspond to conventional polyethers having terminal primary or secondary alcoholic moieties and are synthesized by the well-known addition reaction of $C_1$-$C_4$ alkylene oxide or styrene oxide to a starting active hydrogen compound having one to eight active hydrogen atoms, in the presence of a basic or acidic catalyst.

Examples of starting active hydrogen compounds include monohydroxyl compounds such as methanol, ethanol, butanol, 2-ethylhexanol, lauryl alcohol, stearyl alcohol, allyl alcohol, oleyl alcohol and nonylphenol, di- or polyhydroxyl compounds such as ethylene glycol, propylene glycol, butylene glycol, hexanediol, glycerine, trimethylolpropane, pentaerythritol, sorbitol and sucrose, monoamines such as methylamine, dimethylamine and stearyl amine, di- or polyamines such as ethylenediamine, hexamethylenediamine and tetramethylenepentamine.

About 5 to 100 moles per active hydrogen atom of alkylene oxide and/or styrene oxide may be reacted with the starting active hydrogen compound to give the polyethers of the formula II as is well-known in the art. When these polyethers of the formula II contain different recurring units, these units may form either random or block copolymer.

The resulting polyethers of the formula II may be reacted with about 1 to 5 moles per hydroxyl group of an epoxide of the formula:

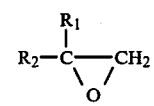

in the presence a basic or acidic catalyst. Examples of preferred epoxides include isobutylene oxide and α-methylstyrene oxide. Examples of basic catalysts include sodium or potassium hydroxide, alcoholate of 1-4 carbon atoms, strontium carbonate, magnesium carbonate, sodium acetate and potassium acetate. Examples of acidic catalysts includes boron trifluoride and aluminum triisopropoxide. The reaction may be carried out at a temperature of 100°-150° C. The reaction time varies depending upon particular reactants and reaction conditions, and is usually from 30 minutes to 5 hours.

The novel polyethers of the present invention have at thereof each terminal end a tertiary alcoholic moiety which is less active than primary or secondary alcoholic terminals possessed by conventional polyethers. Accordingly, they are highly suitable, for example, for preparing polyisocyanate-containing formulations wherein premature reactions should be avoided without compromising properties of the resulting polyurethane resins.

The invention is further illustrated by the following examples wherein all parts and percents are by weight.

EXAMPLE 1

An autoclave having stirring means was charged with 76 parts of propylene glycol and 5 parts of potassium hydroxide, and then purged with nitrogen gas. Then 924 parts of propylene oxide were introduced at a pressure of 3 kg/cm²G and reacted at 130° C. Thereafter 72 parts of isobutylene oxide were introduced to the autoclave at a pressure of 1 kg/cm²G and reacted at 130° C. for 4 hours. After the reaction, 20 parts of synthetic aluminum silicate was added and the mixture stirred at 120° C. at the atmospheric pressure for 3 hours. The mixture was then removed from the reactor and filtered through a one micron filter. 960 parts of polyether having a viscosity of 250 cps at 25° C. were obtained.

EXAMPLE 2

An autoclave having stirring means was charged with 550 parts of nonylphenol-ethylene oxide (7.5 moles) adduct and 1 part of sodium hydroxide, and then purged with nitrogen gas. Then 100 parts of isobutylene oxide was introduced to the autoclave at a pressure of 1.2 kg/cm²G and reacted at 150° C. for 3.5 hours. Then the mixture was neutralized with an equivalent amount of acetic acid. 650 parts of a liquid reaction product having a viscosity of 170 cps at 25° C. were obtained.

EXAMPLE 3

Similar to Example 1, the novel polyethers of this invention were produced from varying starting active hydrogen compounds. Table 1 shows details of the reaction conditions.

TABLE 1

| Run No. | Starting Active Hydrogen Compound Name | (parts) | KOH (parts) | Alkylene oxide (parts) | Isobutylene oxide (parts) | Viscosity of Reaction products (cps, at 25° C.) |
| --- | --- | --- | --- | --- | --- | --- |
| 3-1 | Methanol, | 32 | 2.0 | PO 500 | 72 | 180 |
| 3-2 | Allyl alcohol, | 74 | 3.0 | PO 900 | 72 | 250 |
| 3-3 | Lauryl alcohol, | 186 | 3.5 | PO 900 | 85 | 260 |
| 3-4 | Butanediol, | 90 | 3.0 | PO 800 | 160 | 240 |
| 3-5 | Glycerine, | 92 | 6.0 | PO 1200 | 300 | 280 |
| 3-6 | Trimethylolpropane, | 134 | 6.5 | PO 1600 | 300 | 370 |
| 3-7 | Sorbitol, | 182 | 11.0 | PO 4000 | 432 | 630 |
| 3-8 | Sorbitol, | 182 | 25.0 | PO 6000 | 864 | 750 |
| 3-9 | Sucrose, | 342 | 11.0 | PO 4000 | 576 | 650 |
| 3-10 | Sucrose, | 342 | 25.0 | PO 6000 | 1000 | 800 |
| 3-11 | Nonylphenol | 220 | 4.1 | EO 3520 BO 216 | 144 | Solid |

PO = Propylene oxide
EO = Ethylene oxide
BO = 1,2-Butylene oxide

EXAMPLE 4

A specimen of a polyurethane resin was produced using the reaction product obtained in Example 1. As a control, a corresponding specimen was produced using conventional polypropylene glycol having a molecular weight of 1,000.

Table 2 shows details of the procedure and properties of these specimens.

TABLE 2

|  | Example 4 | Control |
| --- | --- | --- |
| Formulation (parts) | | |
| Urethane prepolymer* | 100 | 100 |
| Reaction product of Ex. 1 | 5 | — |
| Polypropylene glycol, M.W. = 1,000 | — | 5 |
| Tetrabromobisphenol A-ethylene oxide (4 moles) adduct | 10 | 10 |
| Triethylenediamine | 0.1 | 0.1 |
| Production condition | | |
| Scale, grams prepolymer | 500 | 500 |
| Mixing time, seconds | 10 | 10 |
| Tack free time, minutes | 3 | 3 |
| Properties | | |
| Shore hardness | 90 | 85 |
| 100% Modulus, kg/cm² | 56 | 45 |
| Tensile strength, kg/cm² | 102 | 81 |
| Tear strength, kg/cm | 34 | 28 |
| Elongation, % | 400 | 250 |
| Appearance | Homogeneous | Not homogeneous |
| Frame retardancy, UL | V-0 | V-1 |

*Reaction product of polyoxypropylene triol with tolylenediisocyanate having a free isocyanate content of 8%.

What is claimed is:

1. A polyether of the formula:

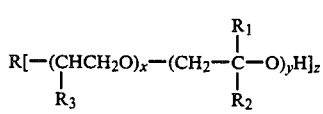

wherein:
R is the residue of a compound selected from the group consisting of ethylene glycol, propylene glycol, butylene glycol, hexanediol, glycerine, trimethylol propane, pentaerythritol, sorbitol and sucrose with removal of the active hydrogen atoms thereof,
$R_1$ is a $C_1$–$C_{10}$ alkyl or aryl,
$R_2$ is a $C_1$–$C_{10}$ alkyl,
$R_3$ is H, $CH_3$, $C_2H_5$ or phenyl,
x is 5–100,
y is 1–5, and
z is 2–8.

2. A polyether of claim 1, wherein $R_1$ is methyl and $R_2$ is methyl or phenyl.

3. A polyether of claim 2, wherein $R_3$ is H or $CH_3$.

4. A polyether of claim 1, wherein $R_1$ and $R_2$ each are methyl.

5. A polyether of claim 1, wherein R is the residue of butanediol, glycerine, trimethylolpropane, sorbitol or sucrose.

* * * * *